UNITED STATES PATENT OFFICE.

RENÉ BOHN, OF MANNHEIM, GERMANY, ASSIGNOR TO THE BADISCHE ANILIN AND SODA FABRIK, OF LUDWIGSHAFEN, GERMANY.

YELLOW DYE AND PROCESS OF MAKING SAME.

SPECIFICATION forming part of Letters Patent No. 623,069, dated April 11, 1899.

Application filed December 27, 1897. Serial No. 663,721. (Specimens.)

*To all whom it may concern:*

Be it known that I, RENÉ BOHN, doctor of philosophy, a citizen of the Swiss Republic, residing at Mannheim, in the Grand Duchy of Baden and Empire of Germany, have invented new and useful Improvements in the Manufacture and Production of Yellow Coloring-Matters from Benzoin, (for which patents were obtained in Germany April 23, 1897, No. 95,739, and in France July 10, 1897, No. 268,637,) of which the following is a specification.

I have discovered that benzoin, which can be obtained in the well-known way from benzaldehyde and potassium cyanid and an aromatic oxy-carbonic acid, such as gallic acid or as beta-dioxybenzoic acid, in the presence of sulfuric acid react to form yellow coloring-matters. The shades obtained with the so-obtained coloring-matters upon chrome-mordanted wool are characterized by their excellent fastness to fulling.

The following examples will serve to illustrate the manner in which my invention can best be carried into practical effect. The parts are by weight.

*Example 1.*—The reaction of benzoin with gallic acid is best prepared as follows: One hundred (100) parts of gallic acid are dissolved in sixteen hundred (1,600) parts of sulfuric acid of 66° Baumé and this solution cooled to between zero degree and plus five degrees centigrade, (0° to 5° centigrade.) Slowly stir into this one hundred and twenty-six (126) parts of benzoin and stir for twenty-four hours. The mass is then poured into eight thousand (8,000) parts of water, and the precipitated coloring-matter is filtered off and washed out. The coloring-matter yields a yellow paste similar to alizarin and is similarly insoluble in water and dissolves difficultly in sodium carbonate with a yellow-brown color. The caustic-soda solution is cherry-red. Sulfuric acid of 66° Baumé gives with the coloring-matter a yellow color possessing a green fluorescence. This coloring-matter is also difficultly soluble in benzene, ligroin, &c., is easily soluble in alcohol, glacial acetic acid, and in nitro-benzene. It crystallizes from glacial acetic acid in yellow-brown crystalline aggregates. It yields an acetyl compound, crystallizing in yellow needles and melting at two hundred and thirty-seven degrees centigrade, (237° centigrade.)

*Example 2.*—The reaction product of benzoin and symmetric dioxybenzoic acid is prepared in a precisely analogous manner. It differs from the condensation product obtained with gallic acid in that it yields greener shades. The coloring-matter dissolves in alkalies with a yellow-red color. The color produced by it in sulfuric acid of 66° Baumé is rhodamin-red and has a brown fluorescence.

Now what I claim is—

1. The process for the manufacture of yellow coloring-matter by treating benzoin with an aromatic oxy-carbonic acid in the presence of sulfuric acid, all substantially as hereinbefore described.

2. The process for the manufacture of yellow coloring-matter by treating benzoin with gallic acid in the presence of sulfuric acid, all substantially as hereinbefore described.

3. As an article of manufacture the yellow coloring-matter which can be obtained by treating benzoin with an aromatic oxy-carbonic acid, and which gives a cherry-red to yellowish-red color with caustic-soda solution, and with sulfuric acid of 66° Baumé a red to yellow color with a brown to green fluorescence, all substantially as described.

4. As an article of manufacture the yellow dyestuff which can be obtained by treating benzoin with gallic acid in the presence of sulfuric acid, and which dissolves difficultly in sodium carbonate with a yellow-brown color; its caustic-soda solution is cherry-red; with sulfuric acid of 66° Baumé it gives a yellow color possessing a green fluorescence, all substantially as hereinbefore described.

In testimony whereof I have hereunto set my hand in the presence of two subscribing witnesses.

RÉNE BOHN.

Witnesses:
GUSTAV L. LICHTENBERGER,
BERNHARD C. HESSE.